July 10, 1951  F. J. WIEGAND ET AL  2,560,263
FLUID LINE CONNECTIONS
Filed May 9, 1946
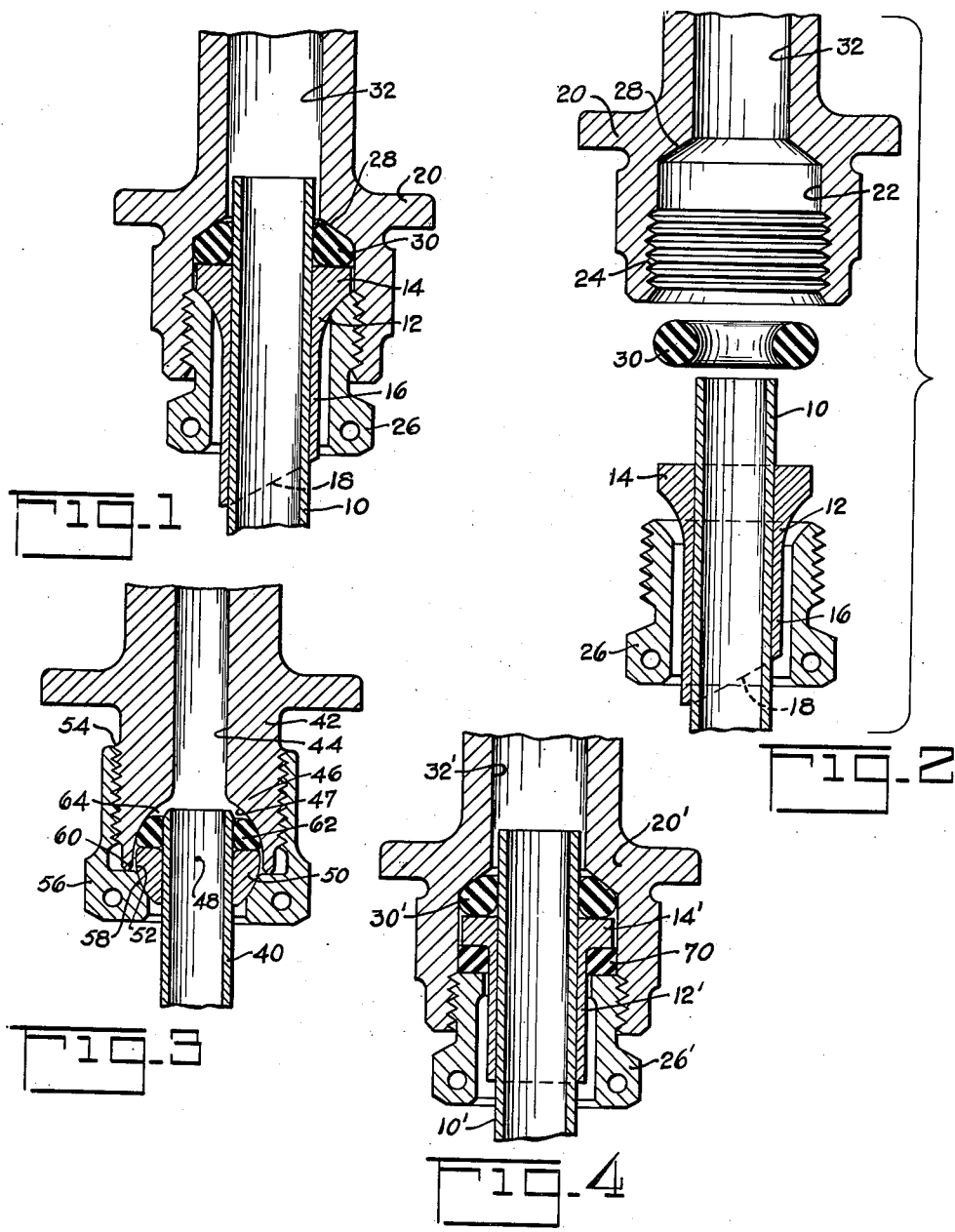
INVENTORS.
FRANCIS J. WIEGAND.
LOUIS W. MEADOR.
BY
ATTORNEY Patented July 10, 1951

2,560,263

UNITED STATES PATENT OFFICE 2,560,263

FLUID LINE CONNECTION

Francis J. Wiegand and Duis W. Meador, Ridgewood, N. J., assignors to Wright Aeronautical Corporation, a corporation of New York Application May 9, 1946, Serial No. 668,491

13 Claims. (Cl. 285—95)

1

This invention relates to tube or pipe joints and is particularly directed to a tube or pipe joint which is simple to manufacture and assemble and which, when assembled, provides a fluid-tight joint capable of providing an effective seal against internal fluid pressures.

Aircraft engines equipped with fuel injection systems require a large number of fuel lines through which fuel is distributed to the various engine cylinders. A large number of joints are required in these fuel lines and some of these joints are disposed in relatively inaccessible locations on the engine. Accordingly, it is essential that the joints be relatively simple to assemble and preferably the joints should be somewhat flexible to permit their assembly even though their mating portions are out of alinement. Also, the joints should provide a fluid-tight seal capable of withstanding large internal pressures in order to prevent leakage of fuel. In most prior art joints, it is necessary that care be taken to properly tighten the joint in order that it have the desired sealing characteristics. Accordingly, in the prior art, the effectiveness of the joint seal to a great extent was dependent on the human element involved. However, because of the dangers resulting from leaking fuel lines in aircraft engines, it is quite important that the possibility of fuel lines leaking because of improper assembly be minimized as much as possible.

It is an object of this invention to provide a relatively simple and novel fuel line joint capable of meeting the aforementioned requirements. Although the invention has been designed to provide a joint or fitting for fuel lines on aircraft engines, the invention is obviously not so limited but is of general application.

Other objects of this invention will become apparent upon reading the annexed detailed description in connection with the drawing in which:

Figure 1 is an axial sectional view through a tube joint embodying the invention;

Figure 2 is an exploded axial sectional view of Figure 1;

Figure 3 is an axial sectional view of a modification; and

Figure 4 is an axial sectional view of a further modification.

Referring first to Figures 1 and 2, a fuel line comprising a metallic tube 10 is provided with a ferrule 12 brazed or otherwise secured to the tube 10 adjacent its one end. The ferrule 12 comprises an external flange or collar portion 14 and a sleeve 16 extending axially along the tube 10

2 from said flange 14 toward the end of the tube remote from said flange. The sleeve portion 16 terminates in a plane inclined to the axis of the tube as indicated at 18, thereby reducing the possibility of the thin tube 10 breaking at its junction with the sleeve 16. The tube 10 is to be coupled to a body member 20 having a chamber or bore 22 for receiving the tube 10. The body member 20 may comprise an elbow or other connecting member which may have similar coupling provisions at its other end or the body member 20 may comprise part of a fuel nozzle or a fuel distributing member.

The outer end of the bore 22 is provided with internal threads 24 within which a nut 26, disposed about the tube 10, is adapted to be threaded. The nut 26 is arranged to be threadedly secured to the body member 20 and to bear against the flange 14 to prevent separation of the tube 10 and body member 20. Also, the nut 26 is designed to have a substantial radial clearance relative to the adjacent portion of the tube 10 so as not to interfere with the flexibility of the tube 10 relative to the body member 20. Means may be provided to limit the extent to which the nut 26 may be tightened. For example, as hereinafter illustrated in Figure 3, the nut may be threaded externally about the body member with the end of the body member acting as a stop for the nut. Also the body member may be provided with means other than a threaded nut for engaging the flange 14.

The bottom of the bore 22 is provided with a preferably conical annular shoulder 28 and a seal washer 30 of resilient rubber-like material is adapted to be disposed between the flange 14 and the shoulder 28. As illustrated in Figure 2, the washer 30 has a free outer diameter slightly larger than the internal diameter of the bore 22 and has a free internal diameter slightly smaller than the external diameter of the tubing 10. At this point, it should be noted that the term "free diameter" of the washer, as used in the specification and claims, is intended to refer to the diameter of the washer when no external forces are applied thereto, except of course for the effect of gravitation. With the washer 30 having said dimensions, the material of the washer is placed in radial compression between the outer wall of the bore 22 and the tube 10 before the nut 26 is even tightened against the flange 14. With this construction, even though the nut 26 merely grips the threads 24 and is not tightened against the flange 14 or is only tightened by hand against the flange 14, the joint has been found to provide an efficient hydraulic seal at low as well as at high internal pressures.

The body member 20, if carried by an aircraft engine, may be subject to considerable vibration during engine operation. This vibration is transmitted to the tube 10 through the metallic path including the nut 26 and the ferrule 12. In this way, only a small percentage of the vibrations pass through the resilient washer 30 and, therefore, the vibrations do not wear the material of the washer to reduce the effectiveness of the seal provided thereby. Also, the vibrations are transmitted to the tube 10 through the reinforcing ferrule sleeve 16 thereby minimizing breakage of the tube 10 as a result of the vibrations transmitted thereto. The flange 14 has an external cylindrical surface co-axial with the flange 14 is slightly smaller than the adjacent internal diameter of the bore 22 to provide a small clearance therebetween. The clearance between the flange 14 and the body member 20 is small enough to prevent extrusion of the rubber-like material of the washer 30 therethrough by the hydraulic pressure within the tube 10. Accordingly, the magnitude of the clearance depends on the particular material of the washer 30 and on the maximum hydraulic pressure occurring within the tube 10. Thus, in an actual satisfactory installation, in which the member 20 was provided with a one-half inch bore 22, the diametrical clearance between the flange 14 and the bore 22 approximated one 100th of an inch. These dimensions are merely cited by way of example and the invention is not to be construed as limited thereto. The small clearance between the flange 14 and the bore 22 provides a little flexibility between the tube 10 and the body member 20, thereby permitting insertion of the tube 10 within the bore 22 even though the tube 10 and bore 22 are slightly out of line. The magnitude of this flexibility is limited or controlled by the axial length of the flange 14.

The tube 10 extends within the bore 32 through the shoulder 28 of the body member 20. The clearance between the tube 10 and the adjacent wall of the bore 32 is larger than that between the flange 14 and the bore 22 whereby the flange 14 pilots the tube 10 within the body member 20. However, the clearance between the tube 10 and the adjacent wall of the bore 32 is sufficiently small to inhibit extrusion of the washer 30 therethrough.

In operation, the hydraulic pressure within the tube 10 acts behind the washer to urge the washer against the flange 14 thereby further compressing the washer 30 between the bore 22 and the tube 10 whereby the washer 30 provides an effective seal. The ferrule 12 has been disclosed as rigidly secured to the tube 10 whereby the nut 26 positively prevents separation of the tube and body member 20—e. g. by the hydraulic pressure therein. However, if the body member 20 and the remote end of the tube are mounted against relative movement and the tube is substantially rigid, then the ferrule need not be secured to the tube 10.

Figure 3 illustrates a modification generally similar to that of Figures 1-2 but permitting greater flexibility between the tube 40 and the body member 42 to which the tube is to be coupled. In Figure 3, the body member is provided with a bore 44 having a shoulder 46 provided with a concave spherical surface 47 facing the open end of the bore through which the tube 40 is received.

The center of curvature of the surface 47 is on the axis of the bore 44 at 48. The tube 40 is provided with a collar or ferrule 50 brazed or otherwise secured to the tube 40 adjacent its end. The ferrule 50 is provided with an external convex spherical surface 52 having a radius of curvature slightly smaller than the radius of curvature of the spherical surface 47.

The body member 42 is provided with external threads 54 to which a nut 56 is adapted to be threadedly secured. The nut 56 is provided with an internal concave spherical surface 58 having a curvature similar to the external spherical surface 52 of the ferrule 50. The nut 56 is adapted to be threaded on the member 42 with its internal spherical surface 58 engaging the external spherical surface 52 of the ferrule 50 thereby securing the tube 40 to the member 42. A washer 62 of resilient rubber-like material is disposed in the annular space 64 between the inner end of the ferrule 50 and the adjacent spherical surface 47 of the shoulder 46. As in the modification of Figures 1-2, the washer 62 has free external and internal diameters respectively larger and smaller than the outer and inner diameters of the annular space 64 occupied thereby. The nut 56 is threaded along the member 42 until it engages the end 60 of the member 42, at which time the center of curvature of its internal spherical surface 58 and the external surface 52 of the ferrule both coincide with the point 48.

The tube 40 extends inwardly to provide only a small clearance between the inner end of the tube 40 and the adjacent wall of the member 42 to restrain extrusion of the washer 62 therethrough. Preferably, the clearance between the ferrule 50 and the adjacent spherical surface 47 is even smaller and corresponds to the clearance between the flange 14 and the bore 22 in Figures 1-2.

The construction of Figure 3 permits substantial misalinement of the tube 40 and the bore 44 and, at the same time, insures an adequate seal. Thus, with the nut 56 engaging the end 60, the annular space 64, between the inner end of the ferrule 50 and the facing spherical surface 47 of the shoulder 46, remains substantially unchanged with changes in the alinement of the tube 40 relative to the bore 44. That is, the annular space 64 does not substantially increase in size on one side and decrease in size on the other side as the alinement of the tube 40 is changed. Accordingly, the alinement of the tube 40 has little or no influence on the effectiveness of the seal. At this point, it should be noted that the nut surface 58 need not be spherical. For example, this surface may be conical and still permit pivotal movement of the tube 10 about the center 48 without distorting the annular space 64. Also, at its area engageable with the nut 56, the ferrule 50 may be provided with an annular insert having good wearing properties.

In Figure 3, as in Figures 1-2, vibrations of the body member are transmitted to the tube primarily through the securing nut and ferrule, whereby the resilient rubber-like washer 62 at most transmits only a small proportion of these vibrations. Also, as in Figures 1-2, the ferrule 50 need not be rigidly secured to the tube 40.

Figure 4 illustrates a modification of Figures 1 and 2 permitting slightly more flexibility than that present in Figures 1-2 without the spherical surfaces of Figure 3. Figure 4 is similar to Figures 1-2 except a second washer 70 is provided and portions of Figure 4, corresponding to portions of Figures 1-2, have been designated by like, but primed, reference numerals. The washer 70 is made from a vibration absorbing material which need not be rubber-like and preferably is more rigid than that of the washer 30'. Thus, the washer 70 may even be formed of a soft metallic material. The washer 70 is disposed between the nut 26' and the flange 14'. With this arrangement, the washer 70, besides providing for slightly greater flexibility of the tube 10', tends to vibrationally isolate the tube 10' from the member 20'.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A fluid-tight joint comprising a first tubular member, a second member having a chamber within which said first member is received, an annular shoulder carried by said second member within said chamber and facing the open end of said chamber through which said first member is received, a collar disposed about and secured to said first member within said chamber and spaced axially outwardly from said shoulder, said first member extending into said chamber beyond said collar, an annular washer of resilient rubber-like material disposed in the annular space about said first member between said collar and shoulder, the securement of said collar to said first member being independent of said washer, said washer having a free external diameter greater than that portion of the radially outer wall of said space engaged by said washer and having a free internal diameter smaller than that portion of the radially inner wall of said space engaged by said washer, the external diameter of said collar being only slightly smaller than that of the adjacent wall of said chamber to prevent extrusion of said washer through the clearance between said collar and chamber wall by the fluid pressure behind said washer and means carried by said second member for retaining said collar within said chamber.

2. A fluid-tight joint comprising a first tubular member, a second member having a chamber within which said first member is received, an annular shoulder carried by said second member within said chamber and facing the open end of said chamber through which said first member is received, a collar disposed about and secured to said first member within said chamber and spaced axially outwardly from said shoulder, an annular washer of resilient rubber-like material disposed in the annular space about said first member between said collar and shoulder, the securement of said collar to said first member being independent of said washer, said washer having a free external diameter greater than that portion of the radially outer wall of said space engaged by said washer and having a free internal diameter smaller than that portion of the radially inner wall of said space engaged by said washer, said first member extending into said chamber beyond said collar and its inner end having at least a small clearance with the adjacent wall of said chamber, said collar having an external diameter only slightly smaller than that of the adjacent wall of said chamber so that the clearance therebetween is sufficiently small to prevent extrusion of said washer therethrough by the fluid pressure behind said washer and means carried by said second member for retaining said collar within said chamber.

3. A fluid-tight joint comprising a first tubular member, a second member having a chamber within which said first member is received, an annular shoulder carried by said second member within said chamber and facing the open end of said chamber through which said first member is received, an annular external flange secured to said first member within said chamber and spaced axially outwardly of said shoulder, said first member extending into said chamber beyond said flange, an annular washer of resilient rubber-like material disposed in the annular space about said tube between said flange and shoulder, the securement of said flange to said first member being independent of said washer, said washer having a free external diameter greater than that portion of the radially outer wall of said space engaged by said washer and having a free internal diameter smaller than that portion of the radially inner wall of said space engaged by said washer, and means carried by and adjustable relative to said second member for retaining said flange within said chamber.

4. A fluid-tight joint comprising a first tubular member, a second member having a chamber within which said first member is received, an annular shoulder carried by said second member within said chamber and facing the open end of said chamber through which said first member is received, a collar disposed about and secured to said first member within said chamber and spaced axially outwardly of said shoulder, an annular washer of resilient rubber-like material disposed in the annular space about said first member between said collar and shoulder, the securement of said collar to said first member being independent of said washer, said washer having a free external diameter greater than that portion of the radially outer wall of said space engaged by said washer and having a free internal diameter smaller than that portion of the radially inner wall of said space engaged by said washer, the external diameter of said collar being only slightly smaller than that of the adjacent wall of said chamber to prevent extrusion of said washer through the clearance between said collar and said chamber wall by the fluid pressure behind said washer, a second annular washer disposed about said first member on the side of said flange remote from said first-mentioned annular washer, and annular means carried by said second member and engageable with said second washer for retaining said collar within said chamber, said second washer being more yieldable than both said annular washer and said collar, but less yieldable than said first-mentioned washer.

5. A fluid-tight joint comprising a first tubular member, a second member having a chamber within which said first member is received, an annular shoulder carried by said second member within said chamber, said shoulder having a concave spherical surface facing the open end of said chamber through which said first member is received, a collar disposed about said first member within said chamber, said collar having an external convex spherical surface on its side remote from said shoulder, and an annular washer of resilient rubber-like material disposed in the annular space about said first member between said collar and shoulder, said washer having a free external diameter greater than that portion of the radially outer wall of said space engaged by said washer and having a free internal diameter smaller than that portion of the radially inner wall of said space engaged by said washer.

6. A fluid-tight joint comprising a first tubular member, a second member having a chamber within which said first member is received, an annular shoulder carried by said second member within said chamber, said shoulder having a concave spherical surface facing the open end of said chamber through which said first member is received, a collar disposed about said first member within said chamber, said collar having an external convex spherical surface on its side remote from said shoulder, an annular washer of resilient rubber-like material disposed in the annular space about said first member between said collar and shoulder, said washer having a free external diameter greater than that portion of the radially outer wall of said space engaged by said washer and having a free internal diameter smaller than that portion of the radially inner wall of said space engaged by said washer, and means carried by said second member for engagement with the convex spherical surface of said collar to retain said collar within said chamber.

7. A fluid-tight joint comprising a first tubular member, a second member having a chamber within which said first member is received, an annular shoulder carried by said second member within said chamber, said shoulder having a concave spherical surface facing the open end of said chamber through which said first member is received, a collar disposed about said first member within said chamber, said collar having a substantially radial side facing said shoulder and an external convex spherical surface on its other side with a radius of curvature only slightly smaller than the radius of the spherical surface of said shoulder, and an annular washer of resilient rubber-like material disposed in the annular space about said first member between said collar and shoulder, said washer having a free external diameter greater than that portion of the radially outer wall of said space, engaged by said washer and having a free internal diameter smaller than that portion of the radially inner wall of said space engaged by said washer.

8. A fluid-tight joint comprising a first tubular member, a second member having a chamber within which said first member is received, an annular shoulder carried by said second member within said chamber, said shoulder having a concave spherical surface facing the open end of said chamber through which said first member is received, a collar disposed about said first member within said chamber, said collar having a substantially radial side facing said shoulder and an external convex spherical surface on its other side with a radius of curvature only slightly smaller than the radius of the spherical surface of said shoulder, an annular washer of resilient rubber-like material disposed in the annular space about said first member between said collar and shoulder, said washer having a free external diameter greater than that portion of the radially outer wall of said space, engaged by said washer and having a free internal diameter smaller than that portion of the radially inner wall of said space engaged by said washer, and means carried by said second member for axially moving said collar against said washer until said spherical surfaces have a substantially common center.

9. A fluid-tight joint comprising a first tubular member, a second member having a chamber within which said first member is received, an annular shoulder carried by said second member within said chamber, said shoulder having a concave spherical surface facing the open end of said chamber through which said first member is received, a collar disposed about and secured to said first member within said chamber, said collar having a substantially radial side facing said shoulder and an external convex spherical surface on its other side with a radius of curvature only slightly smaller than the radius of the spherical surface of said shoulder, an annular washer of resilient rubber-like material disposed in the annular space about said first member between said collar and shoulder, said washer having a free external diameter greater than that portion of the radially outer wall of said space, engaged by said washer and having a free internal diameter smaller than that portion of the radially inner wall of said space engaged by said washer, and means carried by and adjustable relative to said second member for axially moving said collar against said washer until said spherical surfaces have a substantially common center, said means having an internal concave spherical surface similar to and engaging the convex spherical surface of said collar.

10. A fluid-tight joint comprising a first tubular member; a second member having a chamber within which said first member is received; an annular shoulder carried by said second member within said chamber; said shoulder facing the open end of said chamber through which said first member is received; a collar disposed about and secured to said first member within said chamber and spaced axially outwardly from said shoulder; said first member extending into said chamber beyond said collar; and annular washer of resilient rubber-like material disposed entirely in the annular space, of said chamber, about said first member between said collar and shoulder; the securement of said collar to said first member being independent of said washer; said washer having a free external diameter greater than that portion of the radially outer wall of said space engaged by said washer and having a free internal diameter small than that portion of the radially inner wall of said space engaged by said washer; at least that portion of the material of said second member forming the radially outer wall of said annular space being of one piece, and means carried by said second member for retaining said collar within said chamber.

11. A fluid-tight joint comprising a first tubular member; a second member having a chamber within which said first member is received; an annular shoulder carried by said second member within said chamber; said shoulder facing the open end of said chamber through which said first member is received; a collar disposed about and secured to said first member within said chamber and spaced axially outwardly from said shoulder; said first member extending into said chamber beyond said collar; an annular washer of resilient rubber-like material disposed entirely in the annular space, of said chamber, about said first member between said collar and shoulder; the securement of said collar to said first member being independent of said washer; said washer having a free external diameter greater than that portion of the radially outer wall of said space engaged by said washer and having a free internal diameter smaller than that portion of the radially inner wall of said spaced engaged by said washer; at least that portion of the material of said second member forming the radially outer wall of said annular space being of one piece; the external diameter of said collar being only slightly smaller than that of the adjacent wall of said chamber to prevent extrusion of said washer through the clearance between said collar and chamber wall by the fluid pressure behind said washer; and means carried by said second member for retaining said collar within said chamber.

12. A fluid-tight joint comprising a first tubular member; a second member having a chamber within which said first member is received; an annular shoulder carried by said second member within said chamber; said shoulder having a concave spherical surface facing the open end of said chamber through which said first member is received; a collar disposed about said first member within said chamber; said first member extending into said chamber beyond said collar; and an annular washer of resilient rubber-like material disposed in the annular space about said first member between said collar and spherical shoulder surface; said washer having a free external diameter greater than that portion of the radially outer wall of said space engaged by said washer and having a free internal diameter smaller than that portion of the radially inner wall of said space engaged by said washer.

13. A fluid-tight joint comprising a first tubular member; a second member having a chamber within which said first member is received; an annular shoulder carried by said second member within said chamber, said shoulder having a concave spherical surface facing the open end of said chamber through which said first member is received; a collar disposed about and secured to said first member within said chamber and having a substantially radially disposed surface facing inwardly into said chamber and an external convex spherical surface extending toward the open end of said chamber from said radially disposed surface, said first member extending into said chamber beyond its said collar; an annular washer of resilient rubber like material disposed in the annular space about said first member between the radially disposed surface of said collar and the concave spherical surface of said shoulder, said washer having a free external diameter larger than that portion of the radially outer wall of said space engaged by said washer and having a free internal diameter smaller than that portion of the radially inner wall of said space engaged by said washer; and means carried by said second member for retaining said collar within said chamber with its convex spherical surface at least partially overlapped by the concave spherical surface of said shoulder.

FRANCIS J. WIEGAND.
DUIS W. MEADOR.

REFERENCES CITED

The following references are of record in the file of this patent:

UNITED STATES PATENTS

| Number | Name | Date |
|---|---|---|
| 1,584,394 | Munley | May 11, 1926 |
| 1,708,736 | Pallady | Apr. 9, 1929 |
| 2,286,565 | Norton | June 16, 1942 |
| 2,300,584 | Martin | Nov. 3, 1942 |
| 2,301,280 | Howe | Nov. 10, 1942 |
| 2,405,822 | Franck | Aug. 13, 1946 |

FOREIGN PATENTS

| Number | Country | Date |
|---|---|---|
| 265,002 | Great Britain | Feb. 3, 1927 |